(12) United States Patent
Kliper et al.

(10) Patent No.: US 10,824,987 B2
(45) Date of Patent: Nov. 3, 2020

(54) TECHNIQUES FOR EMBEDDING VIRTUAL POINTS OF SALE IN ELECTRONIC MEDIA CONTENT

(71) Applicant: The Joan and Irwin Jacobs Technion-Cornell Innovation Institute, New York, NY (US)

(72) Inventors: Roi Kliper, New York, NY (US); Yosi Dediashvili, Lod (IL)

(73) Assignee: THE JOAN AND IRWIN JACOBS TECHNION-CORNELL INSTITUTE, New York, NY (US)

( * ) Notice: Subject to any disclaimer, the term of this patent is extended or adjusted under 35 U.S.C. 154(b) by 579 days.

(21) Appl. No.: 14/940,373

(22) Filed: Nov. 13, 2015

(65) Prior Publication Data

US 2016/0140532 A1    May 19, 2016

Related U.S. Application Data

(60) Provisional application No. 62/147,771, filed on Apr. 15, 2015, provisional application No. 62/079,804, filed on Nov. 14, 2014.

(51) Int. Cl.
*G06Q 10/08* (2012.01)
*G06Q 20/12* (2012.01)
(Continued)

(52) U.S. Cl.
CPC .......... *G06Q 10/087* (2013.01); *G06N 7/005* (2013.01); *G06Q 20/12* (2013.01); *G06Q 20/20* (2013.01); *G06Q 20/202* (2013.01)

(58) Field of Classification Search
CPC ...... G06Q 10/087; G06Q 20/20; G06Q 20/12; G06Q 20/202; G06N 7/005
(Continued)

(56) References Cited

U.S. PATENT DOCUMENTS 6,326,988 B1    12/2001    Gould et al.
6,868,525 B1    3/2005    Szabo
(Continued)

FOREIGN PATENT DOCUMENTS

WO    2000062172 A1    10/2000

OTHER PUBLICATIONS

The International Search Report and the Written Opinion for PCT/US2017/013175, dated Apr. 27, 2017, ISA/RU, Moscow, Russia.
(Continued)

*Primary Examiner* — Ashford S Hayles
(74) *Attorney, Agent, or Firm* — M&B IP Analysts, LLC

(57) ABSTRACT

A method for embedding a virtual point of sale in electronic media content. The method comprises: identifying product-related information of at least one product in the electronic media content, wherein the electronic media content does not explicitly offer to sell the at least one product; identifying at least one vendor having the at least one product in stock, wherein the at least one product is interrelated to the identified product-related information, wherein identification is based on an estimated inventory of each of the at least one product for each of the at least one vendor; generating a virtual point of sale based on the identified at least one vendor and the identified at least one product; and causing a display of the generated virtual point of sale on the electronic media content.

39 Claims, 20 Drawing Sheets

(51) Int. Cl.
*G06Q 20/20* (2012.01)
*G06N 7/00* (2006.01)
(58) Field of Classification Search
USPC .......................................................... 705/21
See application file for complete search history.

(56) References Cited

U.S. PATENT DOCUMENTS

| | | | |
|---|---|---|---|
| 7,010,577 B1* | 3/2006 | Philyaw | G06F 16/955 709/217 |
| 7,027,999 B2* | 4/2006 | Smith | G06Q 10/06375 705/7.31 |
| 7,685,192 B1 | 3/2010 | Scofield et al. | |
| 7,747,749 B1 | 6/2010 | Erikson et al. | |
| 7,975,019 B1* | 7/2011 | Green | G06Q 30/0631 709/217 |
| 8,010,901 B1 | 8/2011 | Rogers | |
| 8,170,927 B2 | 5/2012 | Godlewski | |
| 8,244,590 B2* | 8/2012 | Rothman | G06Q 30/0601 705/26.1 |
| 8,352,869 B2 | 1/2013 | Melcher et al. | |
| 8,401,911 B1* | 3/2013 | Chu | G06Q 20/18 705/26.1 |
| 8,631,029 B1 | 1/2014 | Amacker | |
| 8,682,739 B1* | 3/2014 | Feinstein | G06K 9/68 705/26.1 |
| 8,813,132 B2* | 8/2014 | Andrews, II | G06Q 30/02 725/60 |
| 9,285,958 B1 | 3/2016 | Hill et al. | |
| 9,319,745 B2* | 4/2016 | Rankine | H04N 21/8456 |
| 9,430,784 B1* | 8/2016 | Frederick | G06Q 30/0214 |
| 9,569,806 B2* | 2/2017 | Mirrashidi | G06Q 30/0641 |
| 9,933,864 B1 | 4/2018 | Worland | |
| 9,978,078 B2* | 5/2018 | Georgoff | G06Q 30/0267 |
| 10,062,103 B2* | 8/2018 | Wantz, II | G06Q 30/0641 |
| 10,121,163 B2* | 11/2018 | Salari | G06Q 30/0241 |
| 2001/0054008 A1 | 12/2001 | Miller et al. | |
| 2002/0059117 A1* | 5/2002 | Yoch | G06Q 30/0641 705/27.1 |
| 2002/0143659 A1* | 10/2002 | Keezer | G06F 16/958 705/27.1 |
| 2002/0143669 A1 | 10/2002 | Scheer | |
| 2003/0101413 A1* | 5/2003 | Klein | G06F 16/9558 715/206 |
| 2004/0030741 A1 | 2/2004 | Wolton et al. | |
| 2004/0075685 A1 | 4/2004 | Ohyama et al. | |
| 2005/0097005 A1* | 5/2005 | Fargo | G06Q 30/0625 705/26.62 |
| 2005/0165766 A1 | 7/2005 | Szabo | |
| 2005/0187967 A1* | 8/2005 | Couch | G06Q 30/02 |
| 2006/0004914 A1 | 1/2006 | Kelly et al. | |
| 2006/0100924 A1* | 5/2006 | Tevanian, Jr. | G06Q 30/0222 705/14.23 |
| 2007/0100799 A1 | 5/2007 | Rose et al. | |
| 2007/0100802 A1* | 5/2007 | Celik | G06Q 10/087 |
| 2007/0156677 A1 | 7/2007 | Szabo | |
| 2007/0208719 A1 | 9/2007 | Tran | |
| 2007/0244831 A1* | 10/2007 | Kuo | G06Q 20/3829 705/67 |
| 2007/0250901 A1* | 10/2007 | McIntire | H04N 21/8586 725/146 |
| 2007/0300142 A1* | 12/2007 | King | G06Q 30/0277 382/181 |
| 2008/0010120 A1* | 1/2008 | Chung | G06Q 30/0251 705/26.1 |
| 2008/0091526 A1 | 4/2008 | Shoemaker | |
| 2008/0092054 A1 | 4/2008 | Bhumkar et al. | |
| 2008/0163379 A1* | 7/2008 | Robinson | G06F 3/04815 726/27 |
| 2008/0209308 A1* | 8/2008 | Brackney | G06Q 30/02 715/205 |
| 2008/0253739 A1* | 10/2008 | Livesey | H04N 21/858 386/241 |
| 2008/0294974 A1 | 11/2008 | Nurmi et al. | |
| 2008/0313108 A1 | 12/2008 | Carrabis | |
| 2009/0034784 A1* | 2/2009 | McQuaide, Jr. | G06F 16/41 382/100 |
| 2009/0148045 A1* | 6/2009 | Lee | G06T 11/00 382/190 |
| 2009/0198767 A1 | 8/2009 | Jakobson et al. | |
| 2009/0248548 A1* | 10/2009 | Obermeyer | G06Q 30/0601 705/28 |
| 2009/0259632 A1 | 10/2009 | Singh | |
| 2009/0271250 A1* | 10/2009 | Sriver | G06Q 30/0601 705/14.4 |
| 2009/0271289 A1* | 10/2009 | Klinger | G06Q 30/02 705/26.1 |
| 2009/0276805 A1* | 11/2009 | Andrews, II | H04N 21/2547 725/35 |
| 2009/0281899 A1* | 11/2009 | Jiang | G06Q 30/0273 705/14.55 |
| 2009/0300528 A1 | 12/2009 | Stambaugh | |
| 2010/0153831 A1* | 6/2010 | Beaton | G06Q 30/0603 715/201 |
| 2010/0169766 A1 | 7/2010 | Duarte et al. | |
| 2010/0185525 A1* | 7/2010 | Hazen | G06Q 10/087 705/26.1 |
| 2010/0205541 A1 | 8/2010 | Rapaport et al. | |
| 2010/0332496 A1* | 12/2010 | Horvitz | G06Q 30/02 707/759 |
| 2011/0004517 A1* | 1/2011 | Soto | G06Q 30/0251 705/14.51 |
| 2011/0010245 A1* | 1/2011 | Priebatsch | H04W 4/029 705/14.58 |
| 2011/0016021 A1* | 1/2011 | Manning | G06Q 30/0633 705/26.8 |
| 2011/0025694 A1 | 2/2011 | Ptucha et al. | |
| 2011/0025709 A1 | 2/2011 | Ptucha et al. | |
| 2011/0035275 A1* | 2/2011 | Frankel | G06F 3/0481 705/14.45 |
| 2011/0099088 A1* | 4/2011 | Berrios | G06Q 30/06 705/26.81 |
| 2011/0131235 A1 | 6/2011 | Petrou et al. | |
| 2011/0131241 A1 | 6/2011 | Petrou et al. | |
| 2011/0238474 A1* | 9/2011 | Carr | G06Q 30/0259 705/14.23 |
| 2011/0276915 A1 | 11/2011 | Freire et al. | |
| 2011/0298830 A1 | 12/2011 | Lam | |
| 2011/0313856 A1* | 12/2011 | Cohen | G06F 16/433 705/14.49 |
| 2012/0016780 A1* | 1/2012 | Lee | G06Q 10/087 705/28 |
| 2012/0095881 A1* | 4/2012 | Rothman | G06Q 30/0643 705/27.2 |
| 2012/0167146 A1* | 6/2012 | Incorvia | H04N 21/4725 725/60 |
| 2012/0179556 A1* | 7/2012 | Ertas | G06Q 30/0241 705/14.73 |
| 2012/0185803 A1 | 7/2012 | Wang et al. | |
| 2012/0203661 A1* | 8/2012 | Baharloo | G06Q 30/0625 705/26.8 |
| 2012/0206647 A1* | 8/2012 | Allsbrook | H04N 21/8586 348/461 |
| 2012/0220346 A1 | 8/2012 | Yu et al. | |
| 2012/0311453 A1 | 12/2012 | Reyna et al. | |
| 2013/0138510 A1* | 5/2013 | Carnevali | G06Q 30/0261 705/14.58 |
| 2013/0282520 A1* | 10/2013 | Tapley | H04W 4/029 705/26.8 |
| 2013/0283200 A1* | 10/2013 | Steelberg | G06F 3/0484 715/781 |
| 2013/0290149 A1* | 10/2013 | Rashwan | G06Q 30/0641 705/27.1 |
| 2013/0325319 A1 | 12/2013 | Moore et al. | |
| 2013/0325644 A1* | 12/2013 | Sivaraman | H04N 21/4882 705/26.1 |
| 2013/0332262 A1* | 12/2013 | Hunt | G06Q 30/02 705/14.43 |

(56) References Cited

U.S. PATENT DOCUMENTS

| | | | |
|---|---|---|---|
| 2014/0019266 A1* | 1/2014 | Stoliartchouk | G06Q 30/0277 705/14.73 |
| 2014/0032518 A1 | 1/2014 | Cohen et al. | |
| 2014/0040027 A1* | 2/2014 | Anderson | G06F 16/951 705/14.53 |
| 2014/0046789 A1* | 2/2014 | Baliga | G06Q 30/06 705/26.1 |
| 2014/0058850 A1* | 2/2014 | Reckert | H04L 51/32 705/14.73 |
| 2014/0129919 A1* | 5/2014 | Benson | G06F 40/166 715/234 |
| 2014/0164913 A1 | 6/2014 | Jaros et al. | |
| 2014/0168076 A1 | 6/2014 | Hicks et al. | |
| 2014/0180832 A1* | 6/2014 | Fox | G06Q 30/0275 705/14.71 |
| 2014/0184475 A1 | 7/2014 | Tantos et al. | |
| 2014/0200998 A1* | 7/2014 | Olliphant | G06Q 30/0256 705/14.53 |
| 2014/0229270 A1* | 8/2014 | Rashwan | G06Q 30/0641 705/14.43 |
| 2015/0062121 A1 | 3/2015 | Karakotsios et al. | |
| 2015/0091906 A1 | 4/2015 | Dishno | |
| 2015/0112790 A1* | 4/2015 | Wolinsky | G06Q 20/32 705/14.38 |
| 2015/0120453 A1* | 4/2015 | Lee | G06Q 30/0267 705/14.58 |
| 2015/0154689 A1* | 6/2015 | Fitzpatrick | G06Q 30/06 705/27.1 |
| 2015/0178786 A1* | 6/2015 | Claessens | G06Q 30/0269 705/14.66 |
| 2015/0227972 A1* | 8/2015 | Tang | G06Q 30/0255 705/14.53 |
| 2015/0294377 A1 | 10/2015 | Chow | |
| 2015/0302011 A1* | 10/2015 | Ochiai | G06F 16/51 705/26.61 |
| 2015/0302424 A1* | 10/2015 | Akbarpour | G06Q 30/0222 705/7.29 |
| 2015/0326925 A1* | 11/2015 | Ozkan | H04N 21/466 725/36 |
| 2015/0332385 A1* | 11/2015 | Hogg | G06Q 20/12 705/26.81 |
| 2015/0350729 A1* | 12/2015 | Reynolds | H04N 21/47217 725/34 |
| 2015/0379615 A1* | 12/2015 | Dhar | G06Q 20/12 705/26.8 |
| 2016/0012142 A1 | 1/2016 | Reed | |
| 2016/0049007 A1 | 2/2016 | Mullins et al. | |
| 2016/0133055 A1 | 5/2016 | Fateh | |
| 2016/0133170 A1 | 5/2016 | Fateh | |
| 2016/0140532 A1* | 5/2016 | Kliper | G06Q 20/202 705/21 |
| 2016/0148304 A1* | 5/2016 | Srinath | G06F 16/955 705/27.1 |
| 2016/0225045 A1* | 8/2016 | Cumberland | G06Q 30/0605 |
| 2016/0267569 A1* | 9/2016 | Hampson | G06Q 30/0256 |
| 2017/0013072 A1 | 1/2017 | Liang et al. | |
| 2017/0078447 A1 | 3/2017 | Hancock et al. | |
| 2017/0116640 A1* | 4/2017 | Sah | G06Q 30/0244 |
| 2017/0200141 A1* | 7/2017 | Pattajoshi | G06Q 20/29 |
| 2018/0225885 A1 | 8/2018 | Dishno | |

OTHER PUBLICATIONS

Patent Cooperation Treaty the International Search Report and the Written Opinion of the International Searching Authority for PCT/US2015/060533, ISA/RU, Moscow, Russia, dated Feb. 25, 2016.

patent Cooperation Treaty Written Opinion of the International Searching Authority for PCT/US2015/060609, ISA/RU, Moscow, Russia, dated Feb. 11, 2016.

\* cited by examiner

FIG. 6A

TECHNIQUES FOR EMBEDDING VIRTUAL POINTS OF SALE IN ELECTRONIC MEDIA CONTENT

CROSS-REFERENCE TO RELATED APPLICATIONS

This application claims the benefit of U.S. Provisional Application No. 62/079,804 filed on Nov. 14, 2014 and U.S. Provisional Application No. 62/147,771 filed on Apr. 15, 2015, the contents of which are hereby incorporated by reference.

TECHNICAL FIELD

The present disclosure relates generally to e-commerce systems, on demand points of sale, and commercialization of media content.

BACKGROUND

The Internet has become the leading marketplace for purchasing goods and services. Consumers now can purchase almost any product, from groceries to vacations, through the internet. There are numerous websites that a consumer can make a purchase through. As an example, Home Depot® owns a website that allows consumers to purchase goods from different vendors, producers, and/or manufacturers. Retail chains, e.g., Target® and other brick-and-mortar stores can offer their goods available at their stores through their websites as well.

In order to purchase a certain product, a consumer has to search for dedicated electronic commerce (e-commerce) outlets, such as websites, applications, etc. that offer the product for sale or search for the product within an e-commerce website. Some existing solutions facilitate online purchases and/or enhance in-store selling via e-commerce websites or search engines. However, such solutions typically allow purchasing products only through a merchant's or a vendor's website. For example, a consumer may be presented with purchasing options for light bulbs on the Home Depot® website, but not when reading about how to screw in a light bulb on HowStuffWorks.com®.

Some e-commerce outlets (e.g., ebay®) allow multiple vendors to offer the same product at a single venue. However, such outlets serve as a single destination site that is primarily price driven and, thus are less attractive to brick-and-mortars stores.

Other disadvantages associated with e-commerce outlets relate to the fact that a consumer cannot easily note if a certain product is "physically" available in a local store. In order to find such information, a consumer first searches for the product through an e-commerce website and then finds a nearby store (if such store exists) that stocks the desired product. Through this process, the inventory verification is performed only after the product is presented to the consumer. Besides being a cumbersome process, e-commerce websites do not always hold accurate information with regard to the current inventory of local stores. That is, e-commerce outlets offering products from brick-and-mortars stores under the same brand may not hold any information about inventory levels at physical stores, or may only have access to aggregate information from all stores. As a result, a product that is available may be presented as unavailable in a certain store, and vice versa. This leads to fewer sales and customer frustration.

In addition, the consumer can gain knowledge about the local availability of the goods only through e-commerce outlets that offer the same goods for sale. For example, a consumer shopping for a light bulb at the Home Depot® website can only find out if the light bulb is available in a nearby Home Depot® store listed on the Home Depot® website. However, the consumer does not know if the same light bulb is in a different nearby hardware store. As local businesses, such as brick-and-mortar stores, typically do not maintain e-commerce websites and/or do not invest in the promotion of such websites, consumers cannot easily locate and purchase goods offered by local businesses through the Internet. Furthermore, the existing e-commerce solutions do not offer any comparison among local businesses offering a certain product. Thus, consumers cannot easily locate, e.g., the closest brick-and-mortar store that offers the desired product or compare prices of a product within a certain perimeter.

Due to the inability to readily obtain accurate information about goods and services offered by local businesses, consumers must often specifically order the products and/or buy the products from more expensive businesses. This may result in longer wait times and/or increased cost to the consumer, particularly when the consumer must obtain the product from a remote business. Generally, in most existing solutions, the consumer is not offered the full range of time-money trade-offs.

Further, on the supply side, businesses may be dissuaded from providing particular products as they cannot be offered effectively. For example, products that tend to decline in value quickly or expire may not be readily offered to consumers in an effective manner. As a result, suppliers may cease or avoid providing certain products due to a lack of demand for the products as offered. As an example, a supplier offering a product whose value will decline rapidly if not sold may choose to forego stocking the product entirely. As a result, the supplier loses potential sales.

Additionally, there is currently an inherent disconnect between offline (brick-and-mortar) stores and their respective online counterparts. This disconnect makes combining offline and online store experiences impracticable. For example, the disconnect between an offline store and an online store owned by the same entity may prevent customers from readily discovering products online and picking up their orders in store or from finding an item in the offline store and paying for the item via the online store (i.e., self-checkout).

In sum, presently there is no solution that facilitates efficient and effective online to offline (O2O) commerce. It would therefore be advantageous to provide an e-commerce solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for embedding a virtual point of sale in electronic media content. The method comprises identifying product-related information of at least one product in the electronic media content, wherein the electronic media content does not explicitly offer to sell the at least one product; identifying at least one vendor having the at least one product in stock, wherein the at least one product is interrelated to the identified product-related information, wherein identification is based on an estimated inventory of each of the at least one product for each of the at least one vendor; generating a virtual point of sale based on the identified at least one vendor and the identified at least one product; and causing a display of the generated virtual point of sale on the electronic media content.

The disclosed embodiments also include a system for embedding a virtual point of sale in electronic media content. The system comprises a processing unit; and a memory, the memory containing instructions that, when executed by the processing unit, configure the system to: identify product-related information of at least one product in the electronic media content, wherein the electronic media content does not explicitly offer to sell the at least one product; identify at least one vendor having the at least one product in stock, wherein the at least one product is interrelated to the identified product-related information, wherein identification is based on an estimated inventory of each of the at least one product for each of the at least one vendor; generate a virtual point of sale based on the identified at least one vendor and the identified at least one product; and cause a display of the generated virtual point of sale on the electronic media content.

The disclosed embodiments also include a method for embedding a virtual point of sale in electronic media content. The method comprises identifying at least one product in the electronic media content, wherein the electronic media content does not explicitly offer to sell the at least one product; identifying at least one vendor offering the at least one product, wherein a physical store of each identified vendor is in the vicinity of a geographical location; determining, for each identified vendor, whether the identified vendor has the at least one product in stock, wherein the determination is based on at least one estimated inventory of each of the at least one product for the identified vendor; generating a virtual point of sale based on each vendor determined to have the product in stock and the identified at least one product; and causing a display of the generated virtual point of sale on the electronic media content.

The disclosed embodiments also include a method for embedding a virtual point of sale in electronic media content. The method comprises identifying at least one product in the electronic media content, wherein the electronic media content does not explicitly offer to sell the at least one product; identifying at least one vendor having the at least one product in stock, wherein the identification is based on an estimated inventory of each of the at least one product for each of the at least one vendor; identifying, based on the identified at least one product, at least one associated product; identifying, based on the at least one associated product, at least one associated product vendor having the associated product in stock; generating a virtual point of sale based on the identified at least one vendor, the identified at least one associated product vendor, the identified at least one product, and the identified at least one associated product; and causing a display of the generated virtual point of sale on the webpage.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

FIG. 6A is a screenshot a webpage of a typical online newspaper article.

DETAILED DESCRIPTION

Figure 1:
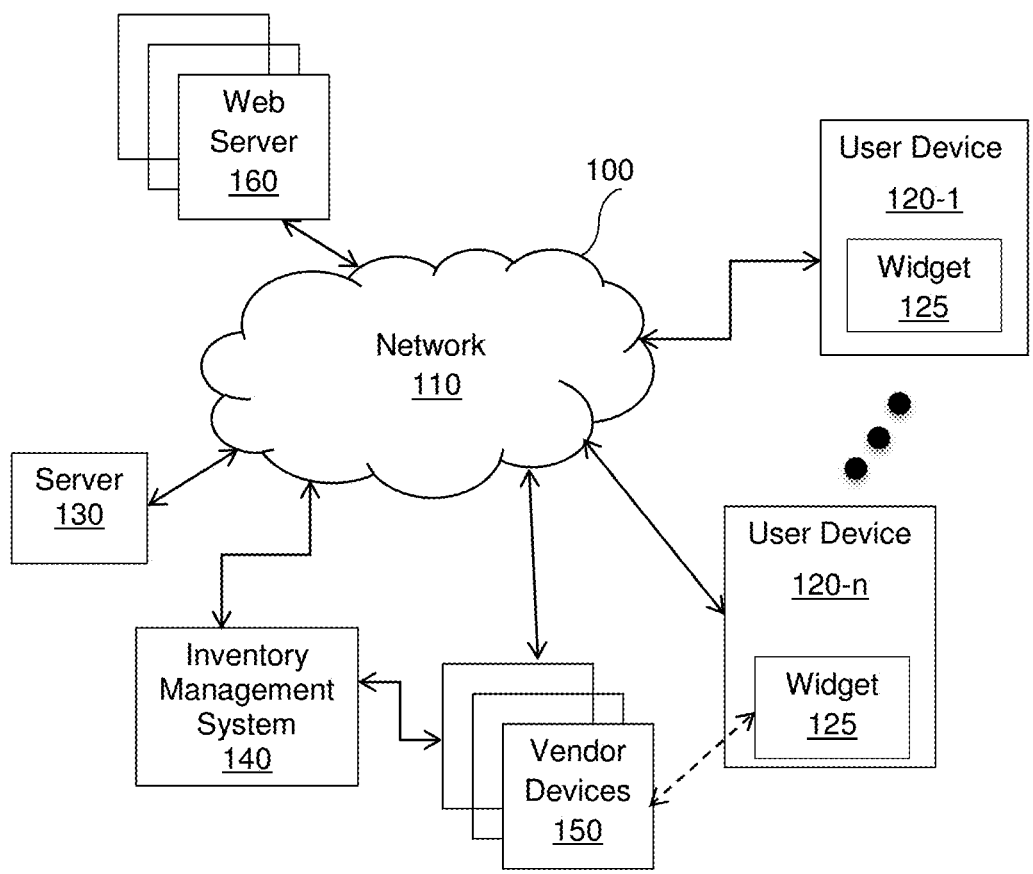
FIG. 1 is a diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a network system 100 utilized to describe the various disclosed embodiments. The system 100 includes a network 110, a plurality of user devices 120-1 through 120-*n* (hereinafter referred to individually as a user device 120 and collectively as user devices 120, merely for simplicity purposes), a server 130, an inventory management system 140, and a plurality of vendor devices 150, and a plurality of web servers 160.

The network 110 may be the Internet, the world-wide-web (WWW), a local area network (LAN), a wide area network (WAN), a metro area network (MAN), and other networks configured to communicate between the elements of the 110. A user device 120 may be a personal computer (PC), a personal digital assistant (PDA), a mobile phone, a smart phone, a tablet computer, a wearable computer device, an e-reader, a game console, and the like. The vendor devices 150 may be any type of e-commerce system operated by the vendors or merchants. A vendor may be a brick-and-mortar vendor (e.g., an offline store), an online vendor, and the like. Examples for such brick-and-mortar vendors are local stores, restaurants, bars, hotels, services providers, and the like. The web servers 160 host websites accessed by the user devices 120. Such websites are not necessarily e-commence websites.

The various embodiments disclosed therein are realized using the server 130 and the inventory management system 140, both of which are also communicatively connected to the network 110. The server 130 is configured to analyze any electronic media content displayed over the user device 120 to determine if there are any goods or services (hereinafter "products" or "a product") that are related to or mentioned in the content viewed by a user of the user device 120. Such electronic media content may be, but is not limited to, a webpage, an e-book, an electronic game, a mobile application (app), and the like. The inventory management system 140 can be updated based on information gathered from merchants, importers, distributors, producers, and/or any entity in the supply chain.

In an embodiment, the media content is pre-processed and sent to the server 130 by a script or a widget 125 executed over the user device 120. In another embodiment, the location of the displayed content, e.g., a URL of a webpage, is sent to the server 130. In yet another embodiment, the content is analyzed by the widget 125 to determine if such content includes at least one product that is related to or mentioned in the content viewed by a user of the device 120. The widget 125 may be embedded in a webpage, an agent installed in the user device, a web browser add-on, an application, a code integrated in a Document Object Model (DOM), and the like.

In an embodiment the media content specifies specific permissions for external entities to analyze, modify and augment the digital media as a whole or in parts.

In some embodiments, the server 130 and/or the widget 125 may perform textual analysis and image analysis to determine if there is at least one product that is related to, or mentioned in, the content viewed by a user of the user device 120. In an embodiment, the determination is performed against a configurable set of product names and a configurable list of vendors that offer these products for sale. For example, if the server 130 and/or the widget 125 is configured with the product names "New Balance 930" and "Nike Air Jordan", appearances or mentions of these products will be identified via textual and/or image analysis.

It should be noted that the server 130 may also be configured with a list of vendors that offer products designated in sets of product names. It should be noted that any vendor, merchant, seller, and/or service provider can register with the server 130 to offer its products for sale. To this end, each such entity is merely required to provide information including any one of a list of products and their prices, its location, operation hours, accepted payment methods, current inventory levels, and so on. It should be further noted that some of the details required for the registration can be retrieved directly from the vendor devices 150 by the server 130.

Upon identification of a product, a location, a purchase history, and/or a user profile of the user of the user device 120 may be determined. This information can be retrieved through a GPS and/or a web browser installed in the user device 120, based on a network connection, from a database, and/or or provided by the user.

In an embodiment, based on this information, the server 130 is configured to identify one or more of the vendors. For example, the server 130 can identify vendors that are in the vicinity of the user device 120 and/or that the user has previously purchased from. The vicinity may include, but is not limited to, in the same neighborhood, borough, town, city, state, or country as the user device; within a predetermined distance of the user device; within a predetermined travel time from the user device based on mode of locomotion (e.g., less than 5 minutes by car); and so on.

In an embodiment, the inventory management system 140 is configured to monitor and estimate the inventory levels of products (goods) being sold by vendors. The inventory management system 140 may or may not be connected to the vendor devices 150. Thus, the inventory levels estimated by the system 140 do not need to be based on updated inventory data entered or provided via the vendor devices 150.

In an embodiment, the inventory management system 140 is configured to estimate the current inventory level of a product at a certain vendor based on information received from a distributor of the product, full or partial information received from the retailer on the product, a plurality of heuristics, and/or purchases made through the server 130.

In some exemplary embodiments, the inventory estimations may further include a tolerance (e.g., potential deviations from the estimation). As a non-limiting example, the inventory management system may determine that a particular vendor likely has 50 pairs plus or minus 2 pairs of a particular kind of sunglasses in stock based on a previous shipment of 100 pairs of the sunglasses one week ago along with heuristic determinations indicating an average rate of sale of the sunglasses on each day of the week.

In an embodiment, the server 130 is configured to send the inventory management system 140 a list of products and vendors. In response, the inventory management system 140 returns the probability that each vendor keeps a sufficient inventory level of a product. A sufficient inventory level may be a configurable parameter, e.g., an integer number greater or equal to 1. As an example, for one order of a product $P_1$ and vendors $V_1$, $V_2$ and $V_3$, the system 140 estimates and returns the values 0.4, 0.9 and 0. That is, the probabilities that vendors $V_1$, $V_2$ and $V_3$ currently hold at least one of product P1 in their inventory are 0.4, 0.9 and 0, respectively.

In certain embodiments, the server 130 is further configured to determine if there are any current promotions associated with each identified product. As an example, a happy hour, a valid coupon, and the like can be determined by the server 130 as current promotions.

At least upon determination that there is a sufficient inventory level for at least one identified product, the server 130 is configured to cause the widget 125 to modify the content (e.g., a webpage) displayed over the user device 120 to inform the user that the content is available for sale. The modification may include adding an interactive feature to the content. The interactive feature allows a user to indicate interest in a product, thereby prompting display of the product's information.

As a non-limiting example, a call-to-action (CTA) button in a form of an icon can be added to a webpage as the interactive feature indicating that a product(s) mentioned in the webpage is available for sale by vendors. The process of modifying the webpages is explained in more detail herein below with respect to FIG. 3. It should be noted that the CTA button may be in any size, shape, and/or color. In an embodiment, the appearance of the CTA button may be determined based on the probability that a respective product is available.

Upon detection of a user's gesture with respect to the interactive feature, a virtual point of sale is generated as an overlay over the displayed content (e.g., user device). The virtual point of sale allows the consumer to purchase the product directly from the vendor without navigating to a different web site. That is, the generated virtual point of sale operates completely within the webpage or other content (e.g., e-book) currently displayed over the user device 120.

In an embodiment, the server 130 is configured to generate the virtual point of sale or a virtual kiosk via the widget 125. To this end, the server 130 is configured to select vendors determined to have inventory of the identified product. The selection may be based on one or more selection criteria such as, but not limited to, the probability computed by the inventory management system 140, promotion information, a location of a vendor with respect to the user, or any combination thereof. As a non-limiting example, the selection may indicate the vendor(s) who is most likely to have the product in stock, the vendor(s) who has the best promotional deal (e.g., the highest percentage or flat amount off regular price), vendor(s) who is closest to the user, and so on. The selection criteria may further be ranked in order of importance.

In a further embodiment, the server 130 is further configured to query a vendor through a respective vendor device 150 about the price of the product and applying a current promotion(s). Thus, a list of vendors and the product prices are displayed to the user as part of the virtual point of sale. The virtual point of sale may further include, but is not limited to, consumer reviews, product information (titles, descriptions, images, product specs, price, quantity, etc.), and so on.

In an embodiment, the server 130 is further configured to enable a purchase transaction between the user and the vendor in response to interaction with the virtual point of sale. If the user wishes to perform a purchase transaction, the server 130 is configured to bill the user for the product, to notify the vendor about the purchase, and/or to inform the user when the product will be ready for pick-up from the vendor or for delivery by a delivery service. In an embodiment, directions to an offline store of the vendor are displayed to the user. The purchase transaction may also allow the user to RSVP, chat, or speak with a vendor's sales representative, share the product with others (e.g., via social media), and so on.

In various embodiments, the user of a user device 120 can perform and complete the entire purchase transaction via the virtual point of sale without navigating away from the webpage or other media content. In an embodiment, to allow the completion of the purchase transaction, a direct communication channel can be established between a vendor device 150 of the respective vendor and the user device 120 via, e.g., the widget 125. Such a communication channel may be realized through emails, SMS messages, instant messaging, or any other generic or dedicated communication protocol.

In an embodiment, the server 130 is further configured to send transaction information to the inventory management system 140 upon completion of a purchase transaction. Such information includes, but is not limited to, the product, an amount of the product ordered, and the respective vendor through which a purchase has been made. The inventory management system 140 updates the estimated current inventory level of the respective product and vendor. In an embodiment, the inventory management system 140 is configured to send a message to the vendor device of the selling vendor indicating that fewer products are now available and/or that a certain amount of the product has been ordered.

In an embodiment, the inventory management system 140 is integrated in the server 130. Each of the server 130 and the inventory management system 140 includes at least a memory and processing unit (not shown). The processing unit may comprise or be a component of a larger processing system implemented with one or more processors. The one or more processors may be implemented with any combination of general-purpose microprocessors, microcontrollers, graphics processing units (GPUs), digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In some implementations, the weight 125 can operate and be implemented as a stand-alone program or, alternatively, can communicate and be integrated with other programs or applications executed in the client device 120.

Figure 2:
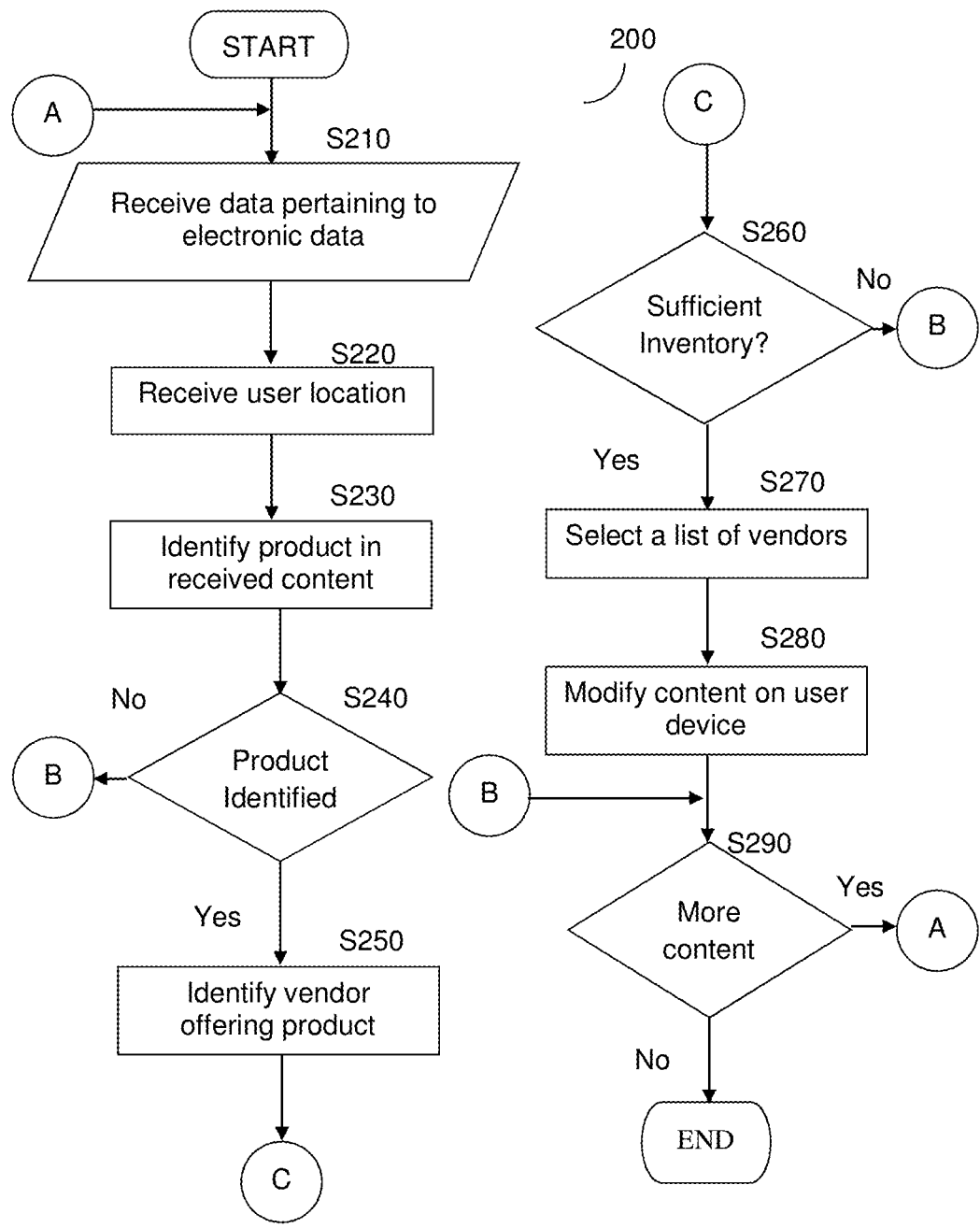
FIG. 2 is a flowchart of a method for generating a virtual point of sale embedded in media content.

FIG. 2 depicts an exemplary and non-limiting flowchart 200 of a method for generating a virtual point of sale embedded in media content according to one embodiment.

At S210, data pertaining to media content viewed by a user over a user device (e.g., user device 120) is received. The content may be an electronic multimedia content including, but not limited to, text, images, videos, combinations thereof, and so on. In an embodiment, a location (e.g., URL) of the displayed content is received. In an embodiment, the content may be non-commerce media, that is, content that was created with a primary purpose other than selling a product. As an example, the content may be an informative webpage, an e-book, an electronic game, and the like. In another embodiment, the content includes items listed in an electronic shopping cart.

At optional S220, the user location is also received. As noted above, such data can be retrieved through a GPS, a web browser, a network connection, and the like.

At S230, the received media content is analyzed to identify at least one product in the received media content. In one embodiment, S230 includes performing textual and/or image analysis to determine if a certain product name is explicitly or implicitly mentioned in the received content, or otherwise if a need for a specific product has been implied in the content. The certain product name may be one of a list of configurable product names. The product name may be implicitly mentioned if, for example, the content mentions a company name (e.g., Amazon®) and a type of product that company sells (e.g., e-book readers).

At S240, a check is made to determine if at least one such product was identified, and if so, execution continues with S250; otherwise, execution proceeds to S290.

At S250, at least one vendor offering the product is identified. In an embodiment, only vendors in the vicinity of the user's locations are identified. The vicinity may include, but is not limited to, in the same neighborhood, borough, town, city, state, or country as the user device; within a predetermined distance of the user device; within a predetermined travel time from the user device based on mode of locomotion (e.g., less than 5 minutes by car); and so on. For example, vendors located in the same neighborhood or town of the user's current location may be selected.

At S260, a check is made if at least one of the identified vendors currently maintains a sufficient inventory level for the identified product. As discussed in detail above, this is performed by querying the inventory management system that returns the probability that the vendor has a sufficient quantity of the product in inventory. It should be noted that an inventory management system may be queried when the media content is loaded to the user device 120. Thus, the user is not required to interact with the displayed content in order to determine if sufficient inventory exists.

If S260 results with a Yes answer, at S270, a list of vendors (hereinafter vendors list) determined to have sufficient inventory are selected. The selection is made based on selection criteria such as, but not limited to, the vendors' locations, the probability for sufficient inventory level, current pricing and promotions, and so on. In a further embodiment, the selection may be further based on rankings and/or weights of each selection criteria.

The vendors list also includes the product's price for the product as requested by the vendor and some metadata information, such as directions, delivery information, and so on. If S260 results with a No answer, execution continues with S290.

At S280, the media content as displayed over the user device is modified to integrate the virtual point of sale, thereby notifying the user of the vendor(s) selling the product. In an embodiment, the virtual point of sale may further allow a user to purchase the product. Modifying content displayed to a user is described further herein below with reference to FIG. 3. At S290, it is determined if there is further content to be analyzed. If so, execution continues with S210; otherwise, execution terminates.

Figure 3:
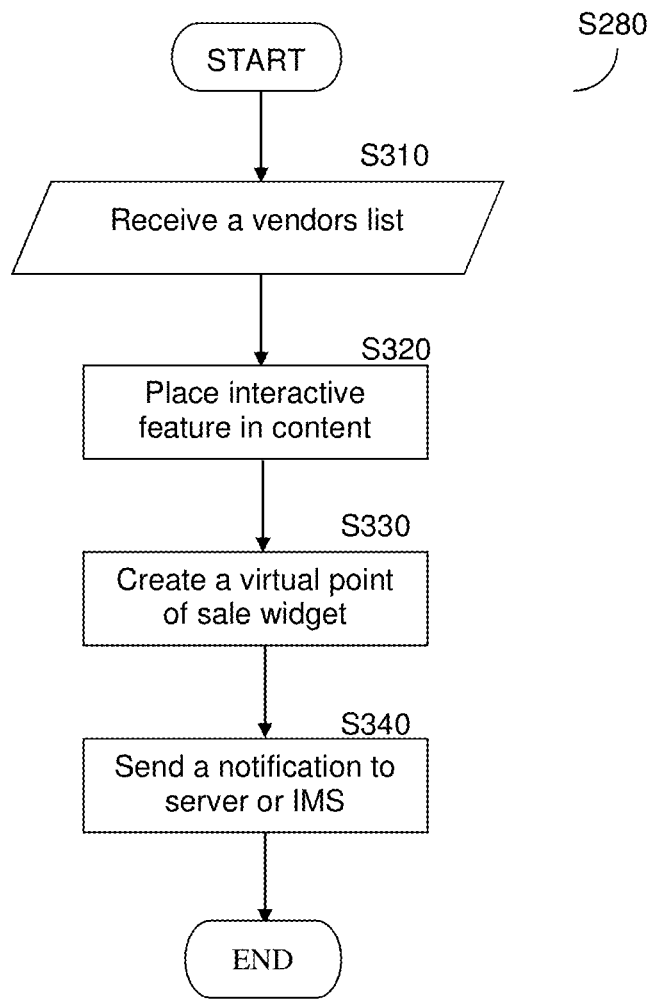
FIG. 3 is a flowchart describing the modification of media content displayed to a user.

FIG. 3 is an exemplary and non-limiting flowchart S280 describing modification of content displayed to the user according to an embodiment. In an embodiment, the content of the user device 120 is modified to integrate the virtual point of sale to allow the user to purchase the product.

At S310, the vendor list is received. At S320, an interactive feature is placed in the content. The interactive feature may be a call to action (CTA) button that can be in a form of an icon or a hyperlink such that any user's gesture with respect the icon will activate the virtual point of sale widget. In an embodiment, the interactive feature can be added in place within the content. In another embodiment, an image included in the content can be replaced with an image that includes the interactive feature.

In yet another embodiment, the interactive feature can be added as an overlay over existing images. In various embodiments, a location of the appearance of the interactive feature within the webpage may be based on the location of the product identified in the webpage. As a non-limiting example, if a product is mentioned in text on a webpage, the interactive feature may be placed in the margin next to the line of text mentioning the product. In another embodiment, the interactive feature may be anchored (i.e., placed on the side of the webpage).

The interactive feature can be associated with any element of the webpage (represented as a DOM element). For example, the web-page can be modified to include interactive features in association with any image, hyperlink, button, a piece of text, script, or any other element used in forming the web-page.

The attributes of the interactive features and the DOM elements that should be modified can by dynamically selected and/or modified by the publishers (owners of the websites hosted by the servers 160) and/or by the vendors through the devices 150.

According to the disclosed embodiments, the modification of the webpage is realized using a script (e.g., a JavaScript) executed in a sandbox (e.g., an iFrame) within the webpage. The script is coded to include a set of flags that determine which DOM elements can be modified and which cannot be modified. The script is embedded in the web-page once the web-page is downloaded to the user device, while the flags' value can be set prior to downloading the page to the web-site or while the page is on the user's web-site.

It should be noted that the configurability of the script does not require designing a new web-page when new offers, products and/or interactive features are available.

An exemplary script including flags for controlling modification of DOM elements to be embedded into a web-page with set values for flags may be seen below:

```
<meta name="object" content= "{sideBar;:true;
products;:[{name;:Natalia;id;:55d4790e69702d365e000000;}
,{;name;:Elleni;
id;:55d47bbe69702d365e010000;}];relatedProducts;:[ ];
producers:[ ];noShow;:false;}"
```

Some flags demonstrated in the above script include: "sidebar" indicating the location of the interactive feature or PoS, the product names and/or IDs that should trigger the generation and display of the interactive feature or PoS, "relatedProducts" indicating which additional products can be offered (in this case, none), and so on.

In an embodiment, the script implements a permission mechanism that allows the publisher to control which DOM elements can be modified and how. The permission mechanism is realized by the setting the flags' values. Such values can be set by the publisher and cannot override the vendors or any other third party.

In an embodiment, the flags' values are saved, for example, in the server 130. In a further embodiment, the script, when loaded to the user device 120, retrieves the flags' values from the server 130. In an embodiment, the publisher can set the flags' values in the server 130 through a web portal (not shown).

It should be appreciated that the disclosed permission mechanism may also be utilized to implement a fully functional point of sale within a publisher (third party) website. The point of sale is executed in a sandbox within a webpage, where the point of sale can access only certain elements of the webpage as permitted by the publisher. For example, the publisher, through the permission mechanisms disclosed herein, can allow the point of sale to perform the following changes: show a DOM element as a green button, change the DOM on the left side of the screen, open a modal of a quarter size screen, allow transactions involving men's shoes of color black and size 7-10, allow payment with one type of credit card, allow transactions for people living in Wisconsin only, and so on.

Execution of the point of sale in a dedicated sandbox provides autonomy while guaranteeing that the vendor does not breach the given permissions. Thus, the publishers can be ensured that the point of sale is secured.

At S330, upon identification of a user's gesture with respect to the interactive feature, a virtual point of sale is created. In an embodiment, the virtual point of sale may be a widget configured to present information from, e.g., a vendor's website to the user. In an embodiment, the virtual point of sale may be configured to display the information in the vendors list, i.e., a side-by-side comparison of information from a plurality of vendors offering the product. In addition, the virtual point of sale may be configured with one or more functions to allow a purchase transaction.

For example, the virtual point of sale may be configured to call a server (e.g., the server 130) to initiate a purchase transaction; to provide the user with direction to a local vendor; and so on. In an exemplary embodiment, the virtual point of sale widget is within a document object model (DOM) of the content or in an overlay atop the content.

As noted above, in an embodiment, the purchase or other action regarding the product may be completed within the virtual point of sale. Thus, at S340, upon completion of a purchase, a notification may be sent to the server, to an inventory management system, and/or directly to a selected vendor.

In a further embodiment, the virtual point of sale further allows the user to purchase multiple products that may or may not related to the primary product. To this end, the virtual point of sale may be configured to identify vendors having the associated products in stock. In a further embodiment, vendors selling both the primary product and the associated products may be identified. In another embodiment, identification of vendors having the associated products in stock may be based on, but not limited to, a proximity of the vendors having the associated products in stock to the vendor selling the primary product. An associated product may be, but is not limited to, an accessory or an otherwise complimentary product. As non-limiting examples, an associated product for wine may be cheese, an associated product for boots may be a purse, an associated product for a meal order may be a beverage, an associated product for a computer game may be downloadable content, and so on.

As noted above, the determination of which and how DOM elements in the page can be modified can be performed on the fly as the script is uploaded to a web-page. In an embodiment, a real-time bidding may be triggered by a request sent by a publisher. In a further embodiment, vendors can bid on which of their products they would like to display on the webpage in connection with each DOM element. For example, a link "order here" can be modified in real-time and inserted into a website of a vendor that places the highest bid.

Various examples for modifying the content to include the interactive feature and the virtual point of sale are provided herein below.

Figure 4A:
FIG. 4A is a screenshot of a webpage of a typical online newspaper article.

FIGS. 4A through 4D show exemplary and non-limiting screenshots illustrating implementation of the disclosed embodiments. FIG. 4A is a screenshot of a webpage 400 featuring an online newspaper article. The article discusses kosher wines and includes images of wine labels and textual descriptions.

Figure 4B:
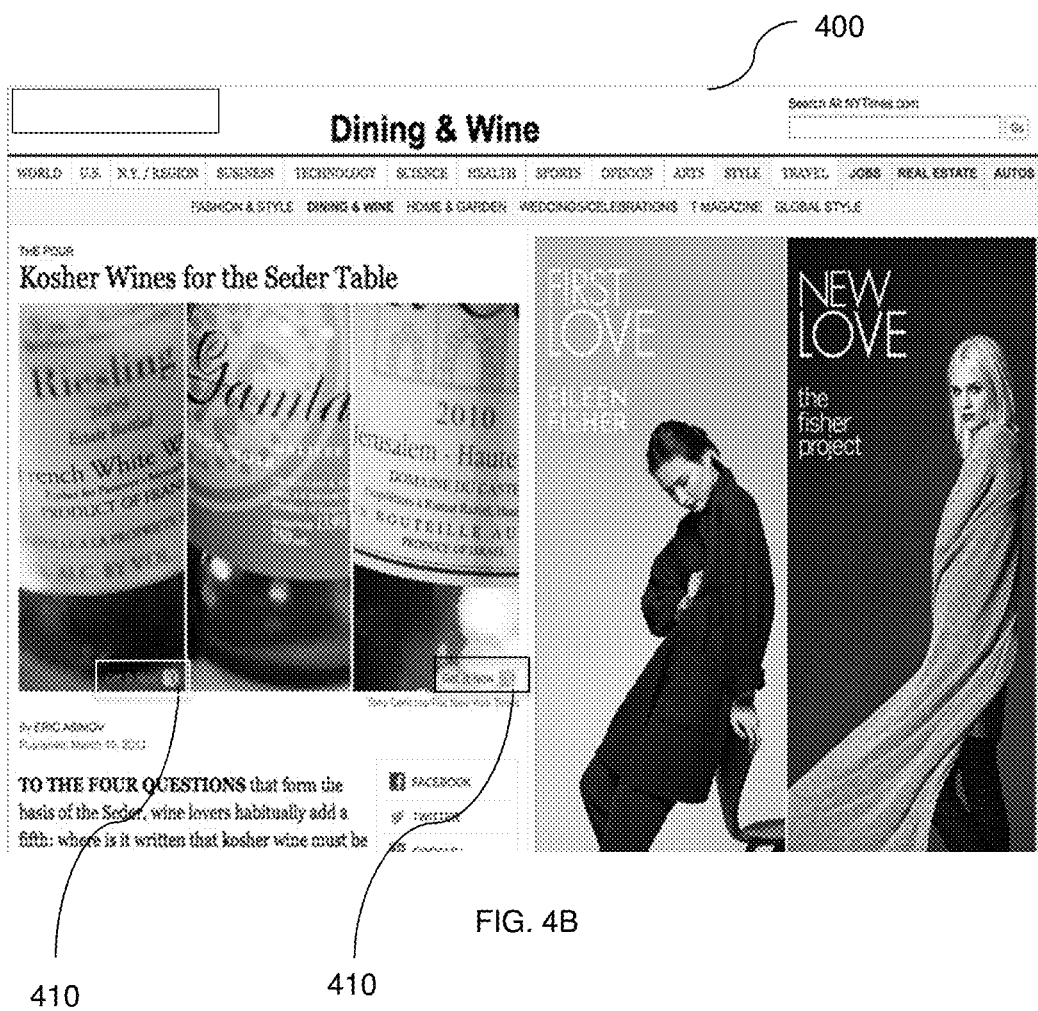
FIG. 4B is a screenshot a webpage of depicting call-to-action (CTA) buttons as overlay icons atop images within the webpage.
Figure 4C:
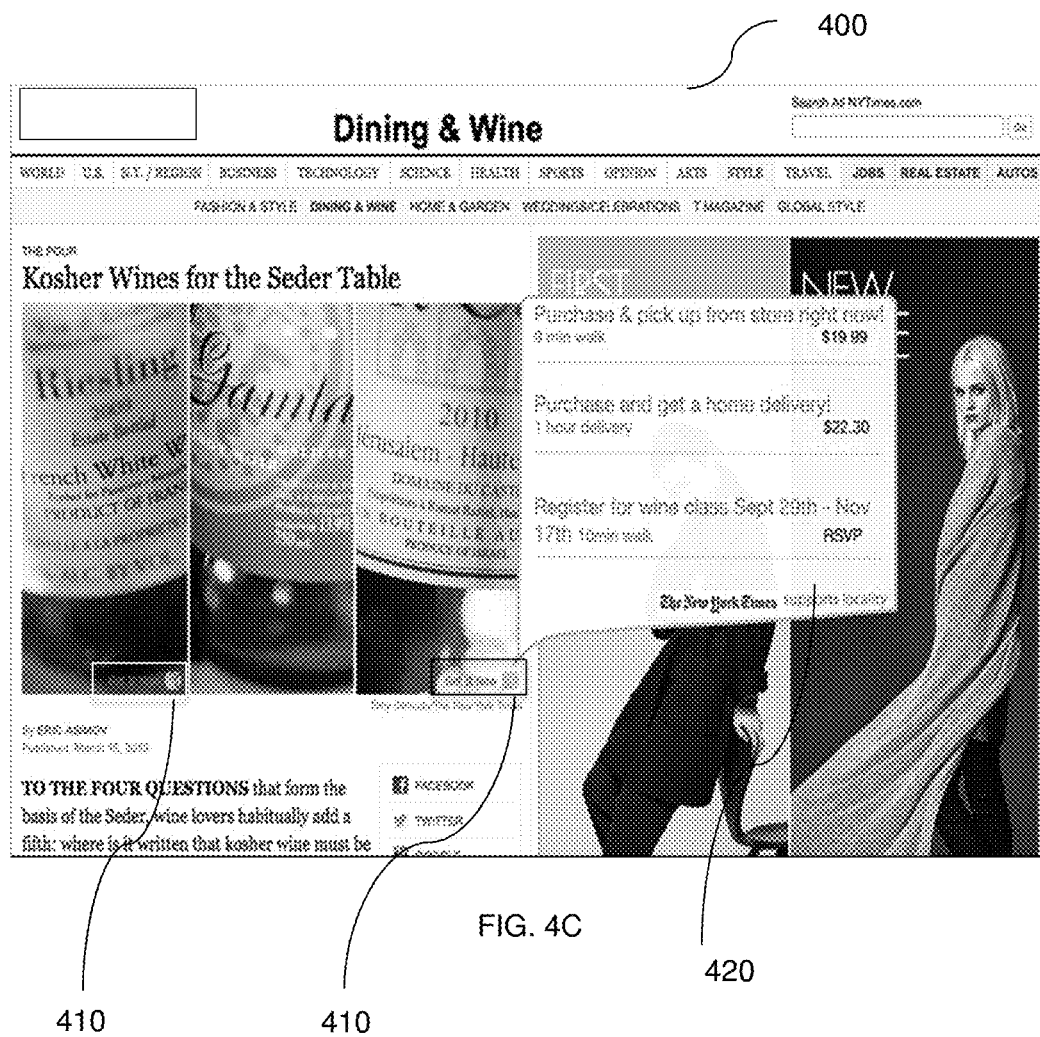
FIG. 4C is a screenshot depicting a non-limiting example of a virtual point of sale widget.

FIG. 4B depicts the addition of interactive features 410 as an overlay icon atop two images of wine labels included in the web page 400. Each of the interactive features 410 is a CTA button. In this example, an image analysis identifies the wine displayed in the images. When a user reading the article interacts with one of the interactive features 410, the interactive feature 410 will cause a display of a virtual point of sale 420 for purchasing the wines discussed in the article as seen in FIG. 4C. It should be noted that the CTA buttons 410 may be any size, shape, or color and are not limited by the depiction herein.

FIG. 4C depicts a non-limiting example of the virtual point of sale 420 when activated by a user. In this example, the virtual point of sale is a widget displaying information overlaid on the webpage 400. The information displayed in the virtual point of sale 420 may show online and/or brick-and-mortar vendors who are selling the product identified in the image. In another embodiment, the interactive feature 410 may cause a search for restaurants local to the user which offer the product and include the restaurants in the information displayed in the virtual point of sale 420. The virtual point of sale 420 may also show pricing information, delivery time, walking distance, and/or other information regarding the vendors.

Figure 4D:
FIG. 4D is a screenshot depicting a non-limiting example of a purchase transaction initiated by a virtual point of sale widget allowing a user to purchase a product.

FIG. 4D depicts a non-limiting example of a purchase transaction 430 initiated by the virtual point of sale 420 allowing the user to purchase the product. The transaction 430 may be initiated responsive to a user interaction with the interactive feature 410.

Figure 5A:
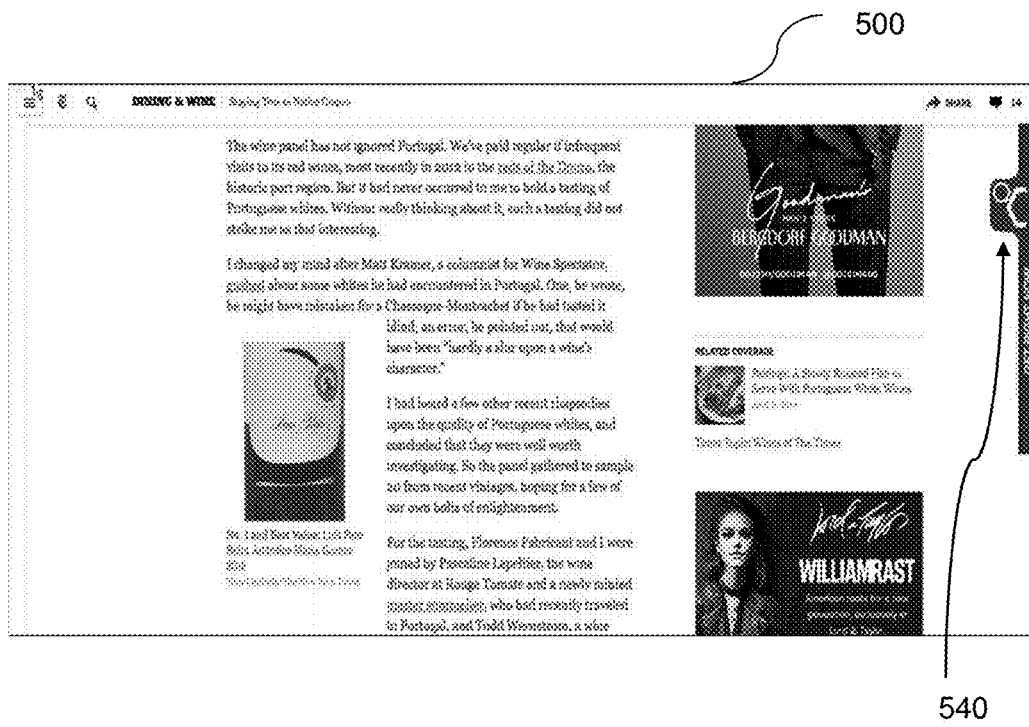
FIG. 5A is a screenshot of a webpage showing a (CTA) button anchored to the side of the webpage of an online article.
Figure 5B:
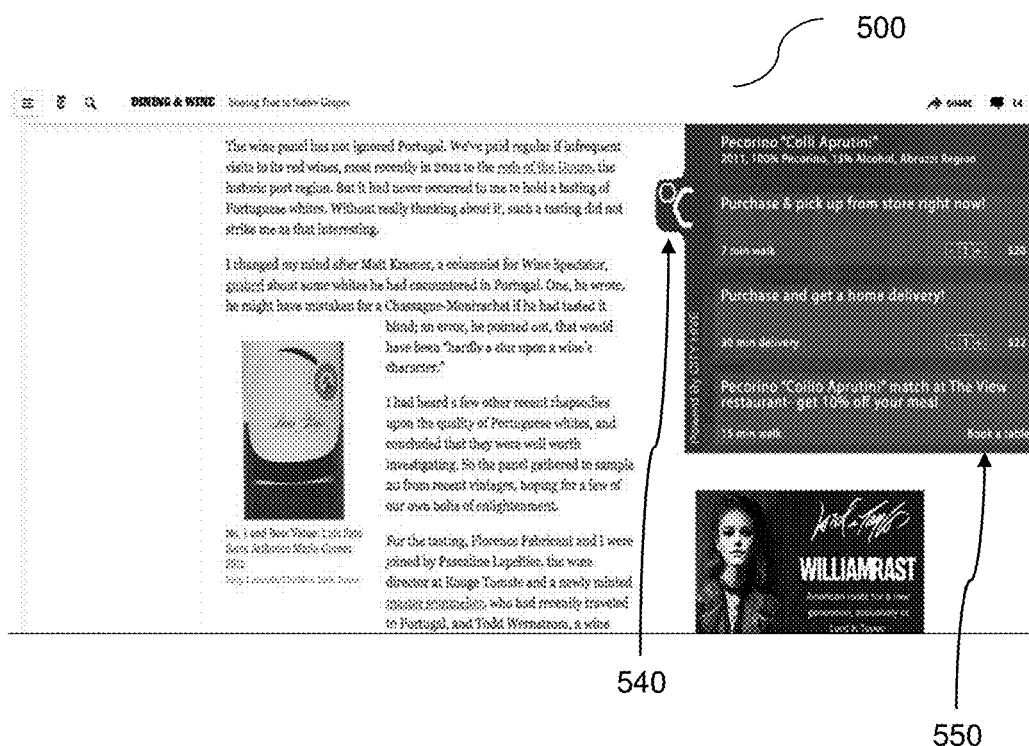
FIG. 5B is a screenshot of a webpage showing an anchored virtual point of sale widget anchored on the side of the webpage.
Figure 5C:
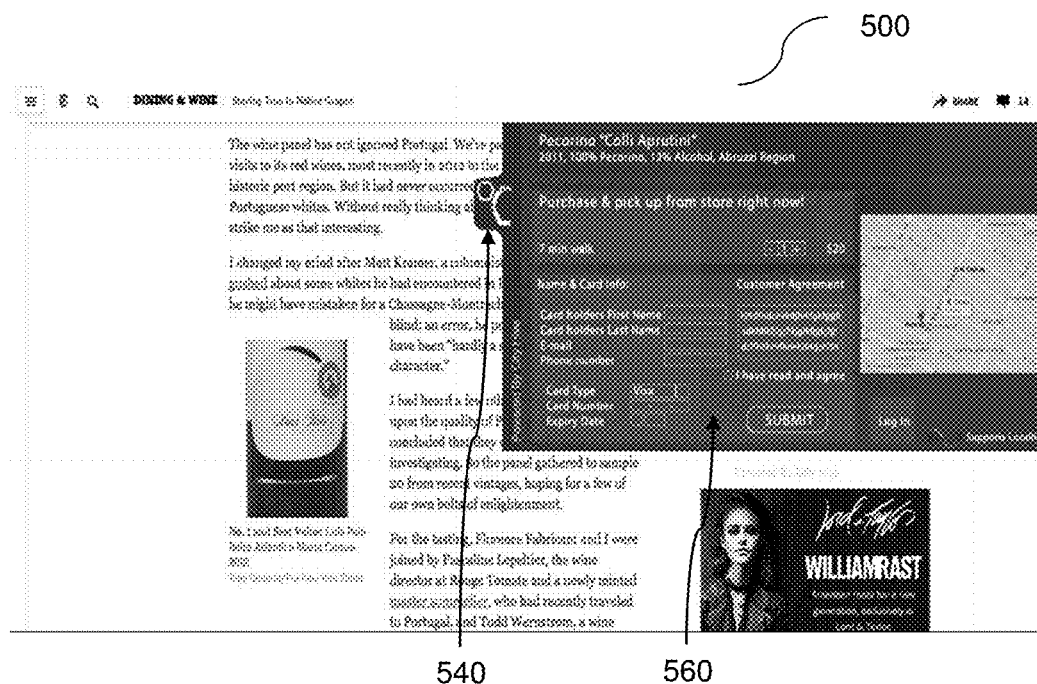
FIG. 5C is a screenshot depicting a non-limiting example of initiation of a purchase transaction through the anchored CTA anchored virtual point of sale widget.

FIGS. 5A through 5C show exemplary and non-limiting screenshots of a webpage 500 featuring a call to action (CTA) button 540 for triggering a virtual point of sale 550 according to an embodiment. FIG. 5A depicts a CTA button 540 anchored to the side of the webpage 500 containing an online food and drink article. The anchored CTA button 540 may be anchored to any location within the webpage 500. FIG. 5B depicts an anchored virtual point of sale 550 anchored on the side of a webpage. In an embodiment, the CTA button 540 will not expand or display the anchored virtual point of sale 550 until the user interacts with the anchored CTA button 540. Such interaction may be, but is not limited to, a mouse click, swipe, hover, and the like.

FIG. 5C depicts a non-limiting example of initiation of a purchase transaction 560 through the anchored CTA button 540 enabling the user to purchase the product. The transaction 560 may be initiated responsive to a user interaction with the anchored virtual point of sale 550. In an embodiment, the location of a vendor on a mapping application, such as Google Maps®, Apple Maps®, and the like may also be displayed if the user indicates a desire to pick up a product from a brick-and-mortar store.

Figure 6B:
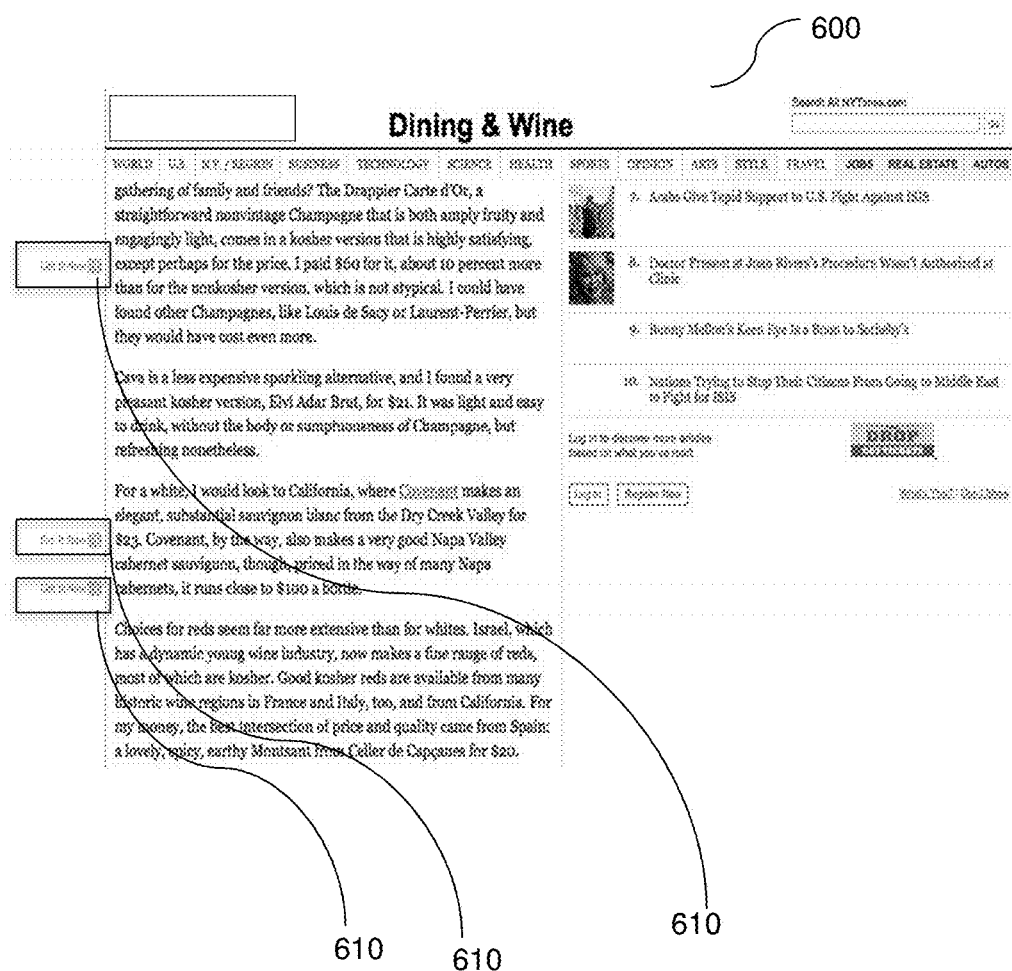
FIG. 6B is a screenshot of a webpage of a newspaper article depicting the addition of CTA buttons respective of text in the article.

FIGS. 6A and 6B show an exemplary and non-limiting implementation of an embedded virtual point of sale widget respective of text in an online article. FIG. 6A is a screenshot of a webpage 600 featuring an online newspaper article. FIG. 6B depicts the addition of CTA buttons 610 respective of text in the article. In this example, a textual analysis identifies products being discussed in the article. In response, the CTA buttons 610 are generated and placed in the margins of the webpage 600 near the discussion of the products. The exact location of the CTA buttons 610 respective of the text may be chosen from, e.g., a plurality of choices of locations for the CTA buttons 610 and is not limited by the depiction herein. As noted above, the CTA buttons 610 are generated and displayed only after the inventory of the respective product has been verified.

Figure 7A:
FIG. 7A is a screenshot of a webpage of a typical online article.
Figure 7B:
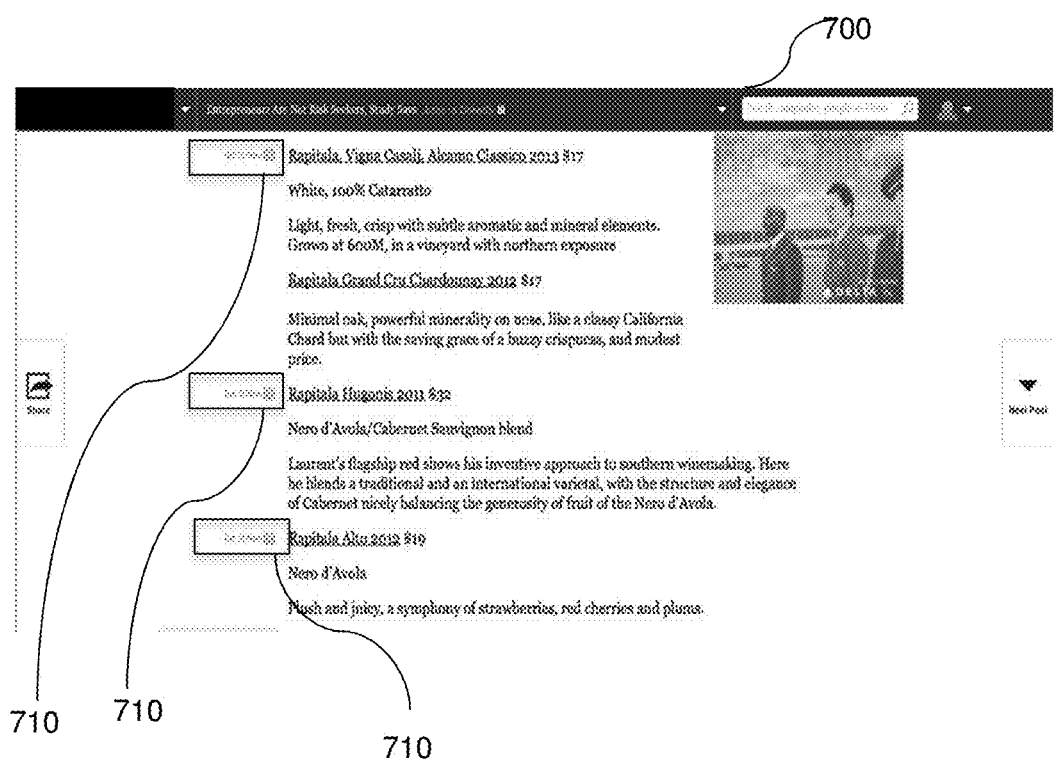
FIG. 7B is a screenshot of the webpage shown in FIG. 7A depicting the addition of CTA buttons respective of products being reviewed in the article.

FIGS. 7A and 7B show another exemplary and non-limiting implementation of the CTA buttons respective of text in an article. FIG. 7A is a screenshot of a webpage 700 featuring an online food and drink review article. FIG. 7B depicts the addition of CTA buttons 710 respective of products being reviewed in the article. In this example, a textual analysis is performed to identify products being reviewed in the article. In response, as seen in FIG. 7B, the CTA buttons 710 are generated and placed near the locations of mentions of the products within the text. The exact location of the CTA buttons 710 respective of the text may be chosen from a plurality of choices of locations for the CTA buttons 710 and is not limited by the depiction herein.

As can be understood from the above examples, the products may be offered for sale and can be purchased by users without the having the user explicitly search for such products. Any of the webpages provided in the above examples are not hosted by e-commerce outlets per se. Thus, the disclosed embodiments allow converting any website's visitors into paying customers for online and brick-and-mortar retailers, thereby allowing online to offline conversion as well.

Figure 8A:
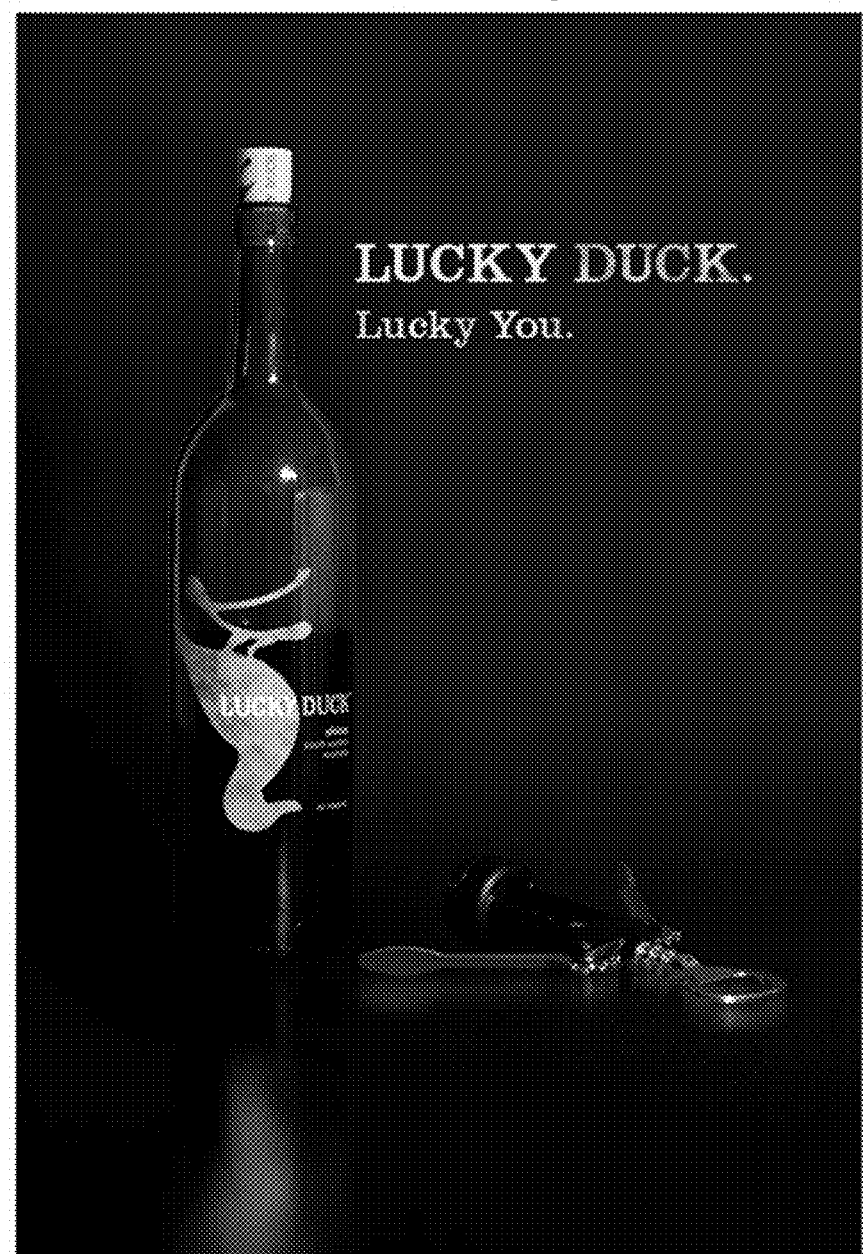
FIG. 8A is a screenshot of a typical online advertisement.
Figure 8B:
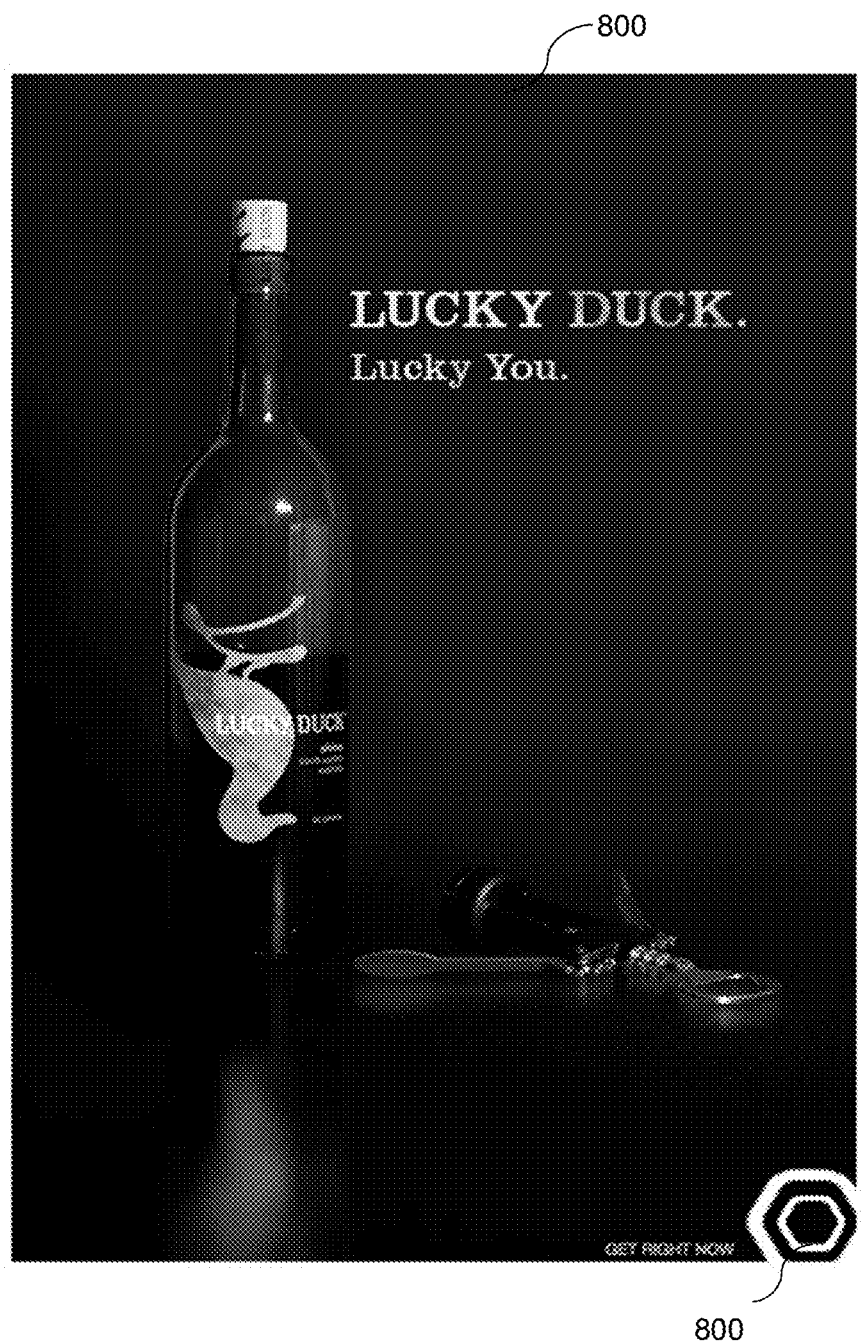
FIG. 8B is a screenshot of CTA buttons as on overlay on the online advertisement.
Figure 8C:
FIG. 8C is a screenshot showing the placement of a modified advertisement in a webpage.

FIGS. 8A through 8C show an exemplary and non-limiting implementation of a CTA button as an overlay on online advertisements. FIG. 8A depicts a typical online advertisement 800 for wine. The advertisement 800 may be currently displayed in a webpage or may be ready to be served by an ad-serving system.

FIG. 8B depicts the addition of a CTA button 810 as on overlay on the advertisement 800. The exact location of the CTA button 810 over the advertisement may be chosen from a plurality of choices of locations and is not limited by the depiction herein.

FIG. 8C shows the placement of the modified online advertisement 800 in place with content in a webpage 870. It should be noted that the modified advertisement including the CTA button 810 can be created by an ad-agency and served by an ad-serving system.

Figure 9A:
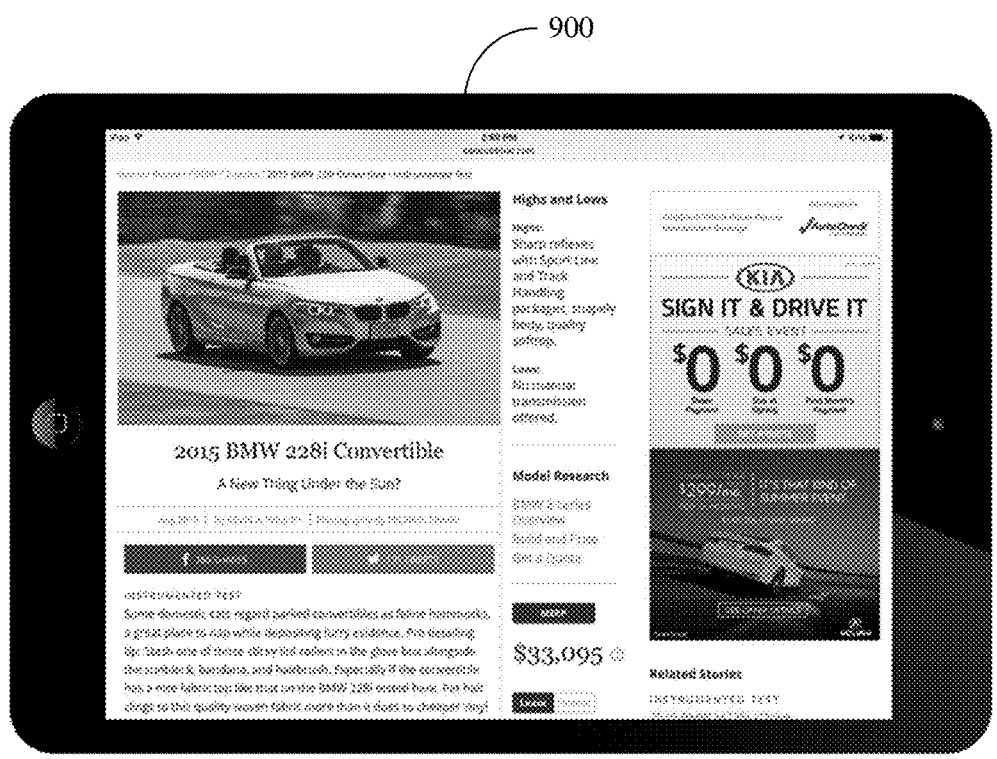
FIG. 9A is a screenshot of a typical online article.
Figure 9B:
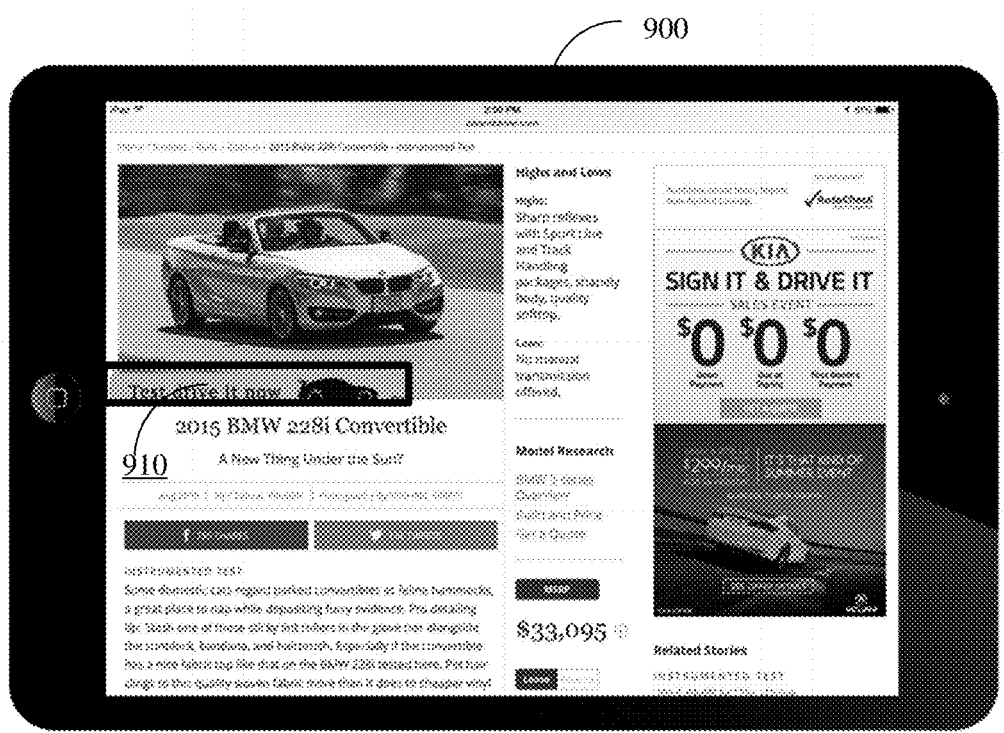
FIG. 9B is a screenshot of the article shown in FIG. 9A depicting the addition of CTA buttons respective of a test drive offer for a car illustrated in the article.
Figure 9C:
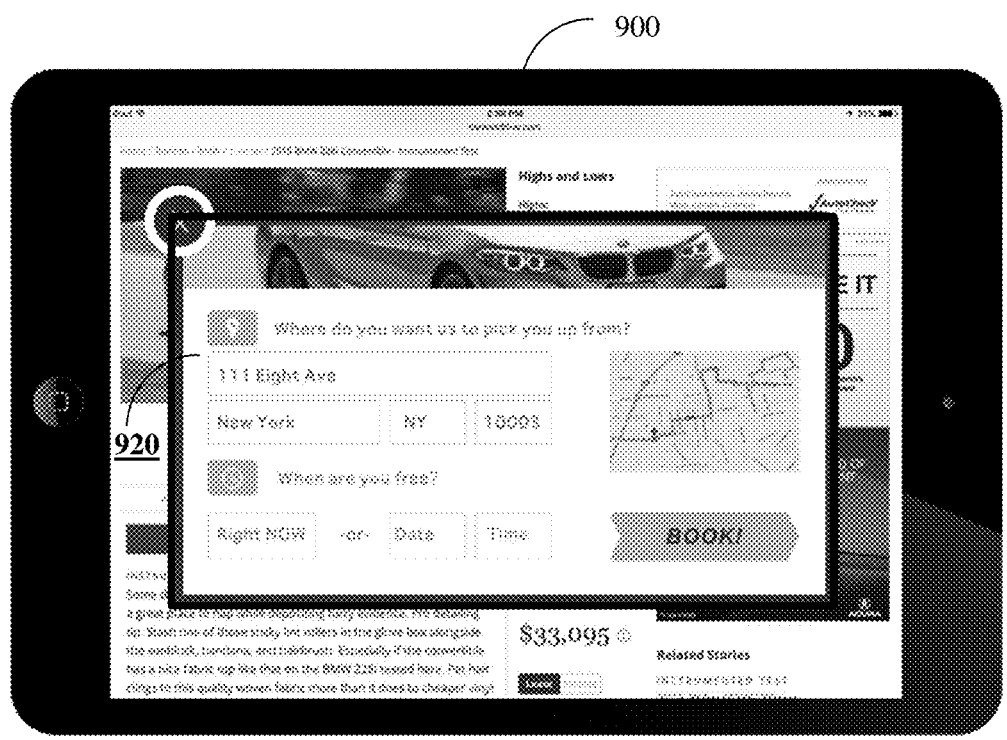
FIG. 9C is a screenshot showing the overlaying of a modified offer window on the article shown in FIG. 9A.

FIGS. 9A through 9C show an exemplary and non-limiting implementation of a virtual point of sale for scheduling an appointment for purchasing a product. In the non-limiting example discussed herein, the test drive of a car.

FIG. 9A illustrates a webpage 900 including an article about a particular make and model of car. The webpage further includes an interactive feature 910. As seen in FIG. 9B a user interacts with the interactive feature 910, he or she is presented with an option to test drive the car via a virtual point of sale 920. The offer to test drive a car is provided based on identification of a vendor that is estimated to have the make and model of the car in stock. FIG. 9C illustrates the virtual point of sale 920 generated in response to the user selection.

It should be noted that, as described herein "product" may be used to refer to goods and/or services and is not limited to either goods or services. The disclosed embodiments can be applied equally to offers for goods, offers for services, and/or mixed offers for goods and services (e.g., a service that will include providing some tangible items).

It should be noted that, as described herein, "point of sale" may include any display on content (e.g., a webpage, media content in a webpage, and so on) allowing an entity to offer products to consumers via the webpage. Such offerings may include, but are not limited to, offering products for sale, offering consumers an opportunity to try products (e.g., booking a test drive for a car), and so on.

It should be noted that the embodiments disclosed herein are described using a call to action (CTA) button as an interactive feature used to trigger a virtual point of sale merely for simplicity purposes and without limitation on the various disclosed embodiments. Other types of interactive features involving different types of interaction (e.g., making noise, swiping, typing, and so on) may be utilized without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, performed by a computer system, for embedding a virtual point of sale in electronic media content, comprising:

identifying, by the computer system, product-related information of at least one product in the electronic media content that is being displayed on a user device of an end user, the electronic media content having been supplied by a source as completed electronic media content, wherein the electronic media content does not explicitly offer to sell the at least one product;

identifying, by the computer system, at least one vendor having the at least one product in stock when at least one vendor has the at least one product in stock, wherein the at least one product is interrelated to the identified product-related information, the identification of the at least one vendor being based on an estimated inventory of each of the at least one product for each of the at least one vendor;

when at least one vendor is identified, generating, by the computer system, a virtual point of sale based on the identified at least one vendor and the identified at least one product; and when at least one vendor is identified, causing, by the computer system, a display of the generated virtual point of sale on the electronic media content at the user device.

2. The method of claim 1, wherein each estimated inventory is a probability that the corresponding vendor has the at least one product in stock.

3. The method of claim 1, wherein identifying at least one vendor having the at least one product in stock further comprises:
identifying at least one vendor offering the at least one product; and
determining whether each of the at least one offering vendor has the product in stock, wherein the determination is based on the at least one estimated inventory.

4. The method of claim 3, wherein a physical location of each identified vendor is in the vicinity of a geographical location of a user.

5. The method of claim 3, wherein determining whether each of the at least one vendor has the product in stock further comprises:
retrieving, from an inventory management system, an estimated inventory for each of the at least one offering vendor.

6. The method of claim 1, further comprising:
identifying, based on the at least one product, at least one associated product; and
identifying, based on the at least one associated product, at least one associated product vendor having the associated product in stock, wherein the generated virtual point of sale includes the at least one associated product and the at least one associated product vendor.

7. The method of claim 6, wherein each associated product vendor is identified when the associated product vendor is one of the identified at least one vendor.

8. The method of claim 7, wherein the at least one associated product vendor is identified based on a proximity of each associated product vendor to each of the at least one vendor.

9. The method of claim 1, wherein the generated virtual point of sale is displayed as any of:
an overlay, a replacement of content in the electronic media content, and in place with content in the electronic media content.

10. The method of claim 1, wherein each vendor is at least a brick-and-mortar store.

11. The method of claim 1, wherein the generated virtual point of sale allows a user to complete a transaction regarding the at least one product.

12. The method of claim 11, wherein completing the transaction includes at least one of:
confirming a purchase, paying for the at least one product, and providing directions to a geographical location of the at least one vendor.

13. The method of claim 11, wherein completing the transaction further comprises:
establishing a direct communication channel between a vendor device and the user device.

14. The method of claim 11, wherein completing the transaction further comprises:
sending the transaction information to an inventory management system.

15. The method of claim 1, wherein identifying the at least one product further comprises:
performing at least one of: textual analysis, and image analysis.

16. The method of claim 1, further comprising:
modifying the electronic media content to include a call-to-action interactive feature.

17. The method of claim 16, further comprising:
embedding a script in the electronic media content, wherein the script is configured to control, using a plurality of flags, at least attributes of the call-to-action interactive feature and elements of the electronic media content to be modified.

18. The method of claim 17, wherein embedding a script in the electronic media content further comprising:
providing a permission mechanism to prevent overriding of values of the flags.

19. The method of claim 1, wherein the electronic media content includes any one of: a webpage, a mobile application, an e-book, and an electronic game.

20. A non-transitory computer readable medium having stored thereon instructions for causing one or more processing units to execute the method according to claim 1.

21. A system for embedding a virtual point of sale in electronic media content, comprising:
a processing unit; and
a memory, the memory containing instructions that, when executed by the processing unit, configure the system to:
identify, by the system, product-related information of at least one product in the electronic media content that is being displayed on a user device of an end user, the electronic media content having been supplied by a source as completed electronic media content, wherein the electronic media content does not explicitly offer to sell the at least one product;
identify, by the system, at least one vendor having the at least one product in stock only if at least one vendor has the at least one product in stock, wherein the at least one product is interrelated to the identified product-related information, the identification of the at least one vendor being based on an estimated inventory of each of the at least one product for each of the at least one vendor;
only if at least one vendor is identified, generate, by the system, a virtual point of sale based on the identified at least one vendor and the identified at least one product; and
only if at least one vendor is identified, cause, by the system, a display of the generated virtual point of sale on the electronic media content at the user device.

22. The system of claim 21, wherein each estimated inventory is a probability that the corresponding vendor has the at least one product in stock.

23. The system of claim 21, wherein the system is further configured to:
identify at least one vendor offering the at least one product; and
determine whether each of the at least one offering vendor has the product in stock, wherein the determination is based on the at least one estimated inventory.

24. The system of claim 23, wherein a physical location of each identified vendor is in the vicinity of a geographical location of a user.

25. The system of claim 23, wherein the system is further configured to:
retrieve, from an inventory management system, an estimated inventory for each of the at least one offering vendor.

26. The system of claim 21, wherein the system is further configured to:
identify, based on the at least one product, at least one associated product; and
identify, based on the at least one associated product, at least one associated product vendor having the associated product in stock, wherein the generated virtual point of sale includes the at least one associated product and the at least one associated product vendor.

27. The system of claim 26, wherein each associated product vendor is identified when the associated product vendor is one of the identified at least one vendor.

28. The system of claim 27, wherein the at least one associated product vendor is identified based on a proximity of each associated product vendor to each of the at least one vendor.

29. The system of claim 21, wherein the generated virtual point of sale is displayed as any of: an overlay, a replacement of content in the electronic media content, and in place with content in the electronic media content.

30. The system of claim 21, wherein each vendor is at least a brick-and-mortar store.

31. The system of claim 21, wherein the generated virtual point of sale allows a user to complete a transaction regarding the at least one product.

32. The system of claim 31, wherein completing the transaction includes at least one of: confirming a purchase, paying for the at least one product, and providing directions to a geographical location of the at least one vendor.

33. The system of claim 31, wherein the system is further configured to:
   establish a direct communication channel between a vendor device and the user device.

34. The system of claim 31, wherein the system is further configured to:
   send the transaction information to an inventory management system.

35. The system of claim 31, wherein the system is further configured to:
   perform at least one of: textual analysis and image analysis.

36. The system of claim 31, wherein the system is further configured to:
   modify the electronic media content to include a call-to-action interactive feature.

37. The system of claim 36, wherein the system is further configured to:
   embed a script in the electronic media content, wherein the script is configured to control, using a plurality of flags, at least attributes of the call-to-action interactive feature and elements of the electronic media content to be modified.

38. The system of claim 37, wherein the system is further configured to:
   provide a permission mechanism to prevent overriding of values of the flags.

39. The system of claim 21, wherein the electronic media content includes any one of: a webpage, a mobile application, an e-book, and an electronic game.

* * * * *